(12) United States Patent
Goerke

(10) Patent No.: US 10,729,273 B1
(45) Date of Patent: Aug. 4, 2020

(54) METHOD AND SYSTEM FOR PRODUCING AND PACKAGING BREWED BEVERAGE PRODUCTS

(71) Applicant: John O. Goerke, Santa Barbara, CA (US)

(72) Inventor: John O. Goerke, Santa Barbara, CA (US)

(73) Assignee: Bona Fide Brewing Company, LLC, Goleta, CA (US)

(*) Notice: Subject to any disclaimer, the term of this patent is extended or adjusted under 35 U.S.C. 154(b) by 538 days.

(21) Appl. No.: 15/397,898

(22) Filed: Jan. 4, 2017

Related U.S. Application Data

(60) Provisional application No. 62/274,840, filed on Jan. 5, 2016, provisional application No. 62/306,723, filed on Mar. 11, 2016.

(51) Int. Cl.
  *A47J 31/00* (2006.01)
  *A47J 31/44* (2006.01)
(52) U.S. Cl.
  CPC ......... *A47J 31/002* (2013.01); *A47J 31/4403* (2013.01); *A47J 31/4485* (2013.01)
(58) Field of Classification Search
  CPC ... A47J 31/002; A47J 31/4403; A47J 31/4485
  See application file for complete search history.

(56) References Cited

U.S. PATENT DOCUMENTS

| 6,003,569 A | 12/1999 | Williams |
|---|---|---|
| 6,319,537 B1 | 11/2001 | Cheng et al. |
| 6,764,594 B2 | 7/2004 | Lee |
| 6,843,164 B2 | 1/2005 | Drobeck |

(Continued)

FOREIGN PATENT DOCUMENTS

| CH | 707314 | * 6/2014 |
|---|---|---|
| CN | 203530041 | 4/2014 |

(Continued)

OTHER PUBLICATIONS

English Translation for JPH06141776 published May 1994.*
English Translation for JPH06070682 published Mar. 1994.*

*Primary Examiner* — Anthony J Weier
(74) *Attorney, Agent, or Firm* — Lieberman & Brandsdorfer, LLC

(57) ABSTRACT

The embodiments described herein relate to brewing and packaging beverage products. Potable water is processed to create brew water. The brew water is stored in an oxygen gas impermeable material. A product is milled in a mill comprised of an oxygen gas impermeable material. A first part of the brew water is heated, which includes heating the first part of the brew water to a first temperature. A primary brew is created by brewing the milled product with the heated brew water for a predetermined contact time. A secondary brew is created by transferring the primary brew to a second chamber comprised of an oxygen gas impermeable material, chilling a second part of the brew water, and combining the primary brew with chilled brew water. A final brew is created by filtering the secondary brew and cooling the filtered secondary brew. The final brew is packaged in a container comprised of an oxygen gas impermeable material.

22 Claims, 3 Drawing Sheets

(56) References Cited

U.S. PATENT DOCUMENTS

| | | | |
|---|---|---|---|
| 7,067,168 B1 * | 6/2006 | Podlucky | A47J 31/0615 |
| | | | 426/431 |
| 7,976,887 B2 | 7/2011 | Inoue et al. | |
| 8,650,892 B2 | 2/2014 | Ferreira et al. | |
| 8,790,513 B1 * | 7/2014 | Boulter | C02F 9/00 |
| | | | 210/104 |
| 2003/0221563 A1 * | 12/2003 | Lee | A23F 3/18 |
| | | | 99/279 |
| 2008/0116136 A1 | 5/2008 | Wilkins et al. | |
| 2011/0163016 A1 | 7/2011 | Saveliev et al. | |
| 2013/0019756 A1 | 1/2013 | Coats et al. | |
| 2013/0298776 A1 * | 11/2013 | Mulder | A47J 31/46 |
| | | | 99/283 |
| 2014/0208953 A1 | 7/2014 | Yui et al. | |
| 2016/0174591 A1 * | 6/2016 | Lampron | A23G 1/002 |
| | | | 426/324 |
| 2016/0374504 A1 * | 12/2016 | Hoon | A47J 31/42 |
| | | | 426/231 |
| 2018/0098658 A1 * | 4/2018 | Angell | A47J 31/002 |

FOREIGN PATENT DOCUMENTS

| | | | |
|---|---|---|---|
| EP | 0209937 | * | 1/1987 |
| EP | 2316796 | | 5/2011 |
| JP | H06070682 | * | 3/1994 |
| JP | 06141776 | | 5/1994 |
| WO | WO2013051078 | * | 4/2013 |

* cited by examiner

METHOD AND SYSTEM FOR PRODUCING AND PACKAGING BREWED BEVERAGE PRODUCTS

CROSS REFERENCE TO RELATED APPLICATION(S)

This application is a non-provisional patent application claiming the benefit of the filing date of U.S. Provisional Patent Application Ser. No. 62/274,840, filed Jan. 5, 2016, and titled "Method and System for Producing and Packaging Brewed Beverage Product" and also claiming the benefit of the filing date of U.S. Provisional Patent Application Ser. No. 62/306,723, filed Mar. 11, 2016, and titled "Method and System for Producing and Packaging Brewed Beverage Product", which are both hereby incorporated by reference.

BACKGROUND

The embodiments described herein relate to beverage production. More specifically, the embodiments relate to producing beverages that may be stored in containers for extended periods of time without preservatives.

Simplifying the preparation of beverage products, including but not limited to coffee, tea, and (yerba) mate, for the ease of the consumer, while maintaining or improving the flavor quality, has been an industry challenge for several decades. Currently, pre-brewed beverage products are normally held in containers such as kegs, cans and bottles, and are maintained using preservatives and/or refrigeration. Otherwise, beverage products are typically distributed as non-pre-brewed granulized or bulk products (e.g., as whole beans, grounds, leaves, etc.), which then may be prepared on site with complicated and highly specialized equipment requiring regular maintenance. These products are served immediately after preparation, and must be consumed before the onset of oxidation (which ruins the flavor) and/or biological contamination. Such oxidation and/or contamination may render the brewed beverage products unfit for consumption. In other cases, where products are packaged with the use of added preservatives, such as artificial chemicals, the fresh brewed flavor is lost. The lack of flavor and quality is traded for the advantage of shelf stability and convenience.

Cold-brewing is a technique that may be implemented in the brewing of beverage products. As its name suggests, cold-brewing includes implementing cold water as the brewing medium. Beverage products brewed by conventional cold-brewing techniques tend to lack the variety of nuanced flavors traditionally appreciated by consumers of warm brewed beverages, such as coffee, tea, and mate.

SUMMARY

The aspects described herein include a method and a system for brewing and packaging beverage products.

According to one aspect, a method is provided for brewing a beverage in a substantially oxygen free environment. A first substantially deoxygenated brew water is heated to a first temperature and a second substantially deoxygenated brew water is chilled to a second temperature less than the first temperature. The first temperature affects extraction of soluble flavor from a brewable product. Brewing is performed in a substantially deoxygenated environment. More specifically, the first brew water is combined with the brewable product to create a heterogeneous mixture. Soluble flavor from the brewable product is extracted into the first brew water including soaking the heterogeneous mixture for a predetermined contact time. The heterogeneous mixture is combined with the second brew water to create a secondary brew at a third temperature. The secondary brew is filtered including removal of the brewable product from the secondary brew. The filtered secondary brew is cooled to a fourth temperature to create the final brew.

According to another aspect, a system is provided to brew a beverage. A heater heats a first substantially deoxygenated brew water to a first temperature and a chiller chills a second substantially deoxygenated brew water to a second temperature less than the first temperature. The first temperature affects extraction of soluble flavor from a brewable product. A brewing system brews in a substantially deoxygenated environment. More specifically, the brewing system combines the first brew water with the brewable product to create a heterogeneous mixture. Soluble flavor from the brewable product is extracted into the first brew water including soaking the heterogeneous mixture for a predetermined contact time. The brewing system combines the heterogeneous mixture with the second brew water to create secondary brew at a third temperature. The brewing system filters the secondary brew including removal of the brewable product from the secondary brew. The brewing system cools the filtered secondary brew to a fourth temperature to create the final brew.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not of all embodiments unless otherwise explicitly indicated.

DETAILED DESCRIPTION

Figure 1:
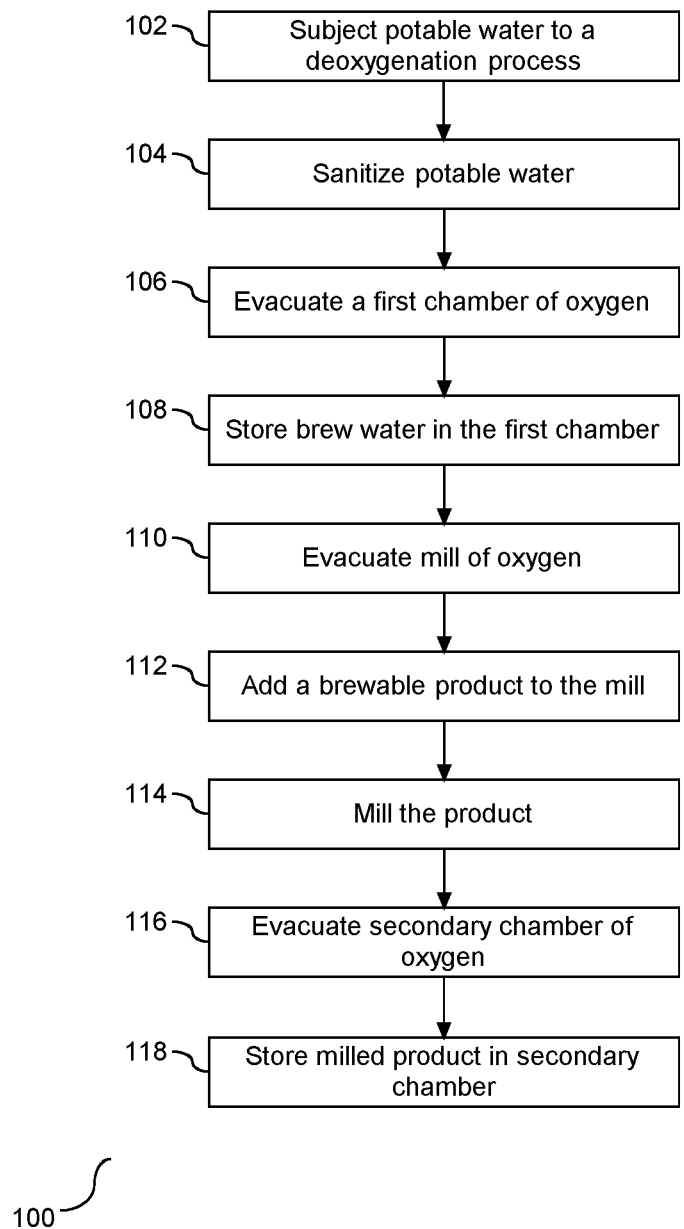
FIG. 1 depicts a flow chart illustrating a process for initializing brewing of a beverage product in a substantially oxygen free environment.

It will be readily understood that the components, as generally described and illustrated in the Figures herein, may be arranged and designed in a wide variety of different configurations. Thus, the following detailed description of the embodiments of the method and system, as presented in the Figures, is not intended to limit the scope of the claims, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the claims.

Unless the meaning is clearly to the contrary, all references made herein to ranges are to be understood as inclusive of the endpoints of the ranges. The modifier "about" used in connection with a quantity is inclusive of the stated value and has the meaning dictated by the context (e.g., includes the degree of error associated with measurement of the particular quantity). Unless the meaning is clearly to the contrary, all references made herein to pressures, such as psi, are to be understood as relative to atmospheric pressure.

Beverage products produced by conventional cold-brewing techniques are prone to oxidation and degradation due to the lack of optimal oxygen gas, hereinafter oxygen, removal during the brew process, and in one embodiment a lack of a pasteurization step which limits shelf life due the potential of biological contamination. A system and method are provided herein to create a beverage product substantially free of oxygen. Oxygen is removed and introduction of contaminants is minimized throughout the brewing process. Potable water is subjected to a deoxygenation process. The product is milled and brewed in an environment substantially free of oxygen. In one embodiment, the final brew is saturated with an inert gas to prevent oxidation of the final brew throughout its shelf life. Accordingly, a beverage product with an improved flavor profile and optimal shelf life is provided.

The term "substantially" in reference to an environment free of oxygen refers to an optimal maximum concentration of oxygen within the environment. In one embodiment, an environment substantially free of oxygen contains less than about 0.5 parts per million (ppm) oxygen. In one embodiment, an environment substantially free of oxygen contains less than about 0.3 ppm oxygen. In one embodiment, an environment substantially free of oxygen contains less than about 0.1 ppm oxygen.

With reference to FIG. 1, a flowchart (100) is provided illustrating a process for initializing brewing of a beverage product in a substantially oxygen free environment. As shown, potable water is processed to create brew water (102). The processing at step (102) includes subjecting the potable water to a deoxygenating process. In one embodiment, the deoxygenating process includes passing the potable water through a degassing system, such as but not limited to a hollow fiber membrane system with a vacuum generator and/or an inert sweep gas (e.g. nitrogen, argon, etc.). In one embodiment, the deoxygenating process includes boiling and/or sparging the potable water. In one embodiment, the potable water is subjected to a deoxygenation process creating substantially deoxygenated water with a dissolved oxygen content of less than about 0.5 parts per million (ppm). In one embodiment, the substantially deoxygenated water has a dissolved oxygen content of less than about 0.3 ppm. In one embodiment, the substantially deoxygenated water has a dissolved oxygen content of less than about 0.1 ppm.

In one embodiment, a sanitization process is performed on the potable water in order to remove dissolved solids and to disinfect the potable water (104). The sanitizing may include a filtering process such as performing reverse osmosis to remove dissolved solids, and exposing the potable water to ultraviolet (UV) light to disinfect the potable water. In one embodiment, the sanitized brew water has a dissolved solid level less than about 75 ppm. Similarly, in one embodiment, the sanitized brew water has a dissolved solid level from about 50 to 75 ppm. The reverse osmosis process may be performed prior to the UV light process. Reverse osmosis and UV light techniques are known in the art, and a further description of such techniques will not be provided herein. In one embodiment, reverse osmosis is performed on the potable water before the deoxygenation process, and the deoxygenation process is performed on the potable water before the UV light process.

A first chamber comprised of an oxygen impermeable material is evacuated of oxygen (106), and the brew water is stored in the evacuated first chamber (108). The evacuation includes minimizing the oxygen concentration within the chamber. Deoxygenating the water and maintaining a substantially oxygen free environment by evacuation of the first chamber used for storage minimizes oxidation and degradation of the final brew. Additionally, removal of biological contamination increases shelf life of the final brew. Accordingly, as shown, brew water is processed and then maintained in the first chamber in an environment substantially free of oxygen.

A mill comprised of an oxygen impermeable material is evacuated of oxygen (110), and a brewable product is added to the mill (112). The brewable product may be any product that can be brewed via a cold-brewing process, such as coffee, tea, (yerba) mate, etc. The mill is then utilized to mill the product into a desired form (e.g. shape and size) that is optimal for flavor extraction (114). During the milling, the environment is maintained as substantially free of oxygen by flushing the chamber with an inert gas, such as but not limited to nitrogen gas, hereinafter nitrogen. In one embodiment, the product is coffee and during the milling the coffee releases carbon dioxide which helps maintain the environment as substantially free of oxygen. The milled product produced during step (114) is substantially free of oxygen. A secondary chamber comprised of an oxygen impermeable material is evacuated of oxygen (116), and the milled product is transferred to the secondary chamber comprised of an oxygen impermeable material (118). Accordingly, the brew water and the milled product are stored in separate chambers, both substantially free of oxygen and both comprised of an oxygen impermeable material.

As shown herein, both the brew water and the milled product are subjected to a deoxygenating process, and their storage chambers are evacuated of oxygen prior to storage. In one embodiment, the evacuations of oxygen at steps (106), (110) and (116) are performed by purging the chamber/mill with an inert gas to displace the $O_2$ within the chamber/mill. In one embodiment, the inert gas is nitrogen. In one embodiment, the nitrogen used to purge the oxygen should have a purity of at least about 99.7% to limit the introduction of contaminants such as oxidizers, undesired flavors or other contaminants which affect the flavor profile or shelf life of the final brew. Other methods of displacing oxygen and providing an environmental substantially free of oxygen that are known in the art may be employed in accordance with the embodiments described herein. In one embodiment, the evacuation removes 99% of the oxygen. In one embodiment, the evacuation removes 99.7% of the oxygen. In one embodiment, the evacuation removes 99.9% of the oxygen. Accordingly, the evacuation process described herein is not limited to utilizing an inert gas to purge the chamber to displace oxygen.

Figure 2:
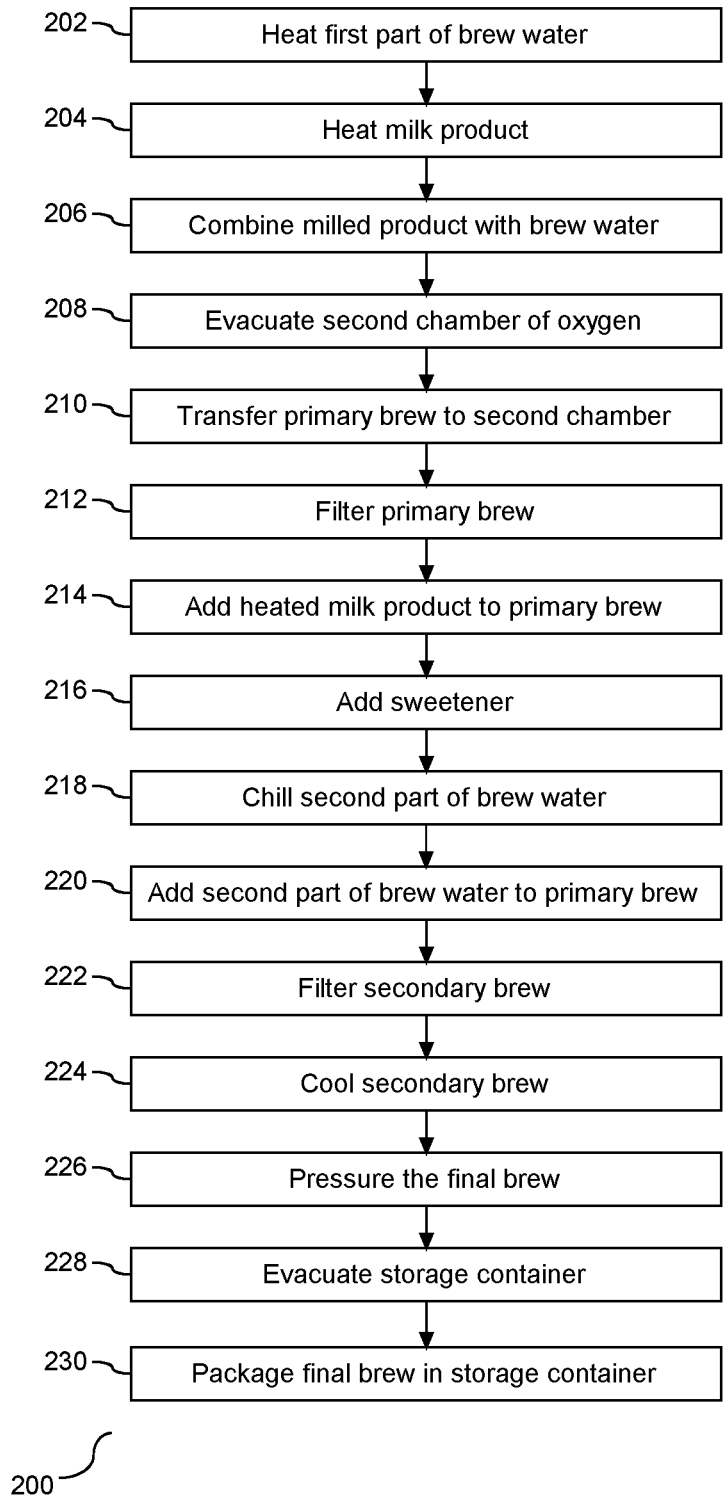
FIG. 2 depicts a flow chart illustrating a process for brewing a beverage product in a substantially oxygen free environment.

Brew water and a milled product are utilized in a brewing process to create a brewed beverage substantially free of oxygen. With reference to FIG. 2, a flowchart (200) is provided illustrating a process for brewing a beverage product in a substantially oxygen free environment. A first part of brew water is heated (202) from an initial temperature to a first temperature in the range from about 70-211 degrees Fahrenheit. In one embodiment, the brew water is created by processing potable water as described in FIG. 1. The environment of the first chamber is maintained as substantially free of oxygen. The maintenance of the environment includes preventing oxygen from entering the chamber during the heating process. In one embodiment, the maintenance of the environment includes a constant evacuation process, for example purging with an inert gas, sparging of the contents of the chamber, etc. The temperature of the brew water affects the extraction of soluble flavors. A first temperature is chosen based on the product the soluble flavors are being extracted from and the desired flavor profile for the final brewed product. For example, coffee, tea, (yerba) mate may have ideal different brewing temperature, and different subgenuses (e.g. Arabica/Robusta, Columbian/Ethiopian, etc.) of each product may have different ideal brew temperature. In one embodiment, the extraction of soluble flavors is also dependent upon a roast of the product, water purity, extraction time, grind size and other brewing procedures. Accordingly, the brew water is heated and maintained in an environment substantially free of $O_2$.

In one embodiment, the initial temperature is in the range from about 32-100 degrees Fahrenheit. In one embodiment, the first temperature is in a range selected from the following, but not limited to, about 70-100, about 170-205, and about 190-205 degrees Fahrenheit. In one embodiment, the brew water is heated at step (202) to a temperature of around 198 degrees Fahrenheit. In one embodiment, step (202) includes a pasteurization of the brew water including heating the brew water to a temperature above 161 degrees Fahrenheit for at least 30 seconds wherein biological contamination is limited. The extent of extraction of soluble flavors from the product affects flavor profiles. For example, a higher extraction temperature such as 190-205 degrees Fahrenheit may provide a more intense flavor (e.g. higher extent of extraction) relative to a lower extraction temperature such as 70-100 degree Fahrenheit which may provide a smoother, less intense taster profile (e.g. lesser extent of extraction). In one embodiment, the temperature of the brew water affects release of aromatics from the product which counteracts undesired flavor profiles (e.g. bitterness). Accordingly, the temperature throughout the stages of the brewing process affects the flavor profile of the coffee.

In one embodiment, a milk product is heated (204). Examples of a milk product include, but are not limited to, a dairy-based milk product (e.g., condensed milk), and a non-dairy-based milk products in powdered form (e.g., almond milk, soy milk, etc.). The milk product may be sweetened with a sweetener, such as, but not limited to, a sugar (i.e., sucrose) or non-sugar product (e.g. artificial sweetener). Similar to the heating of the brew water, the heating of the milk product occurs in an environment substantially free of oxygen. The milk product is heated from an initial temperature to a milk temperature from about 170-200 degrees Fahrenheit. In one embodiment, the milk product is heated to a temperature of around 198 degrees Fahrenheit. Accordingly, the process optionally includes heating a milk product.

A primary brew and a secondary brew are created, as described in detail herein. The primary brew is created by a brewing process including combining the milled product with the heated brew water to create a heterogeneous mixture in the first chamber and allowing the brew water to extract soluble flavors from the product (206). The milled product and the heated brew water are brewed at step (206) for a predetermined contact time to achieve an initial pre-dilution strength of the primary brew. The initial pre-dilution strength is an optimal extent of extraction of soluble flavors from the product in relation to the desired flavor profile of the final brew. The predetermined contact time is specific to the type of milled product (e.g. product type, origin, roast, grind, etc.), and in one embodiment, may be an amount of time ranging from about 30-600 seconds. In one embodiment, the predetermined contact time is inversely related to the temperature of the heated brew water, such as a higher temperature (e.g. 198 degrees Fahrenheit) requires a lesser amount of contact time (e.g. 35 seconds). In one embodiment, higher contacts times (e.g. 500-600 seconds) and/or higher temperatures (e.g. 190-205 degrees Fahrenheit) may provide a more intense flavor (e.g. higher extent of extraction of soluble flavors) relative to a shorter contact time (e.g. 30-100 seconds) and a lower temperature (e.g. 70-100 degrees Fahrenheit) which may provide a smoother, less intense taste profile (e.g. lesser extent of extraction of soluble flavors). Accordingly, the brewing parameters are adjusted to produce a desired taste profile.

A second chamber comprised of an oxygen impermeable material is evacuated of oxygen (208), and the primary brew is transferred to the second chamber (210). In one embodiment the primary brew is filtered (212). In one embodiment, the filtering includes passing the primary brew through a filter media in the range of about 5-20 microns. In one embodiment, after filtering at step (212), the total dissolved solids of the primary brew is less than about 2.5%, and in another embodiment, the total dissolved solids of the primary brew is in the range of about 1-2.5%. In one embodiment, following step (212) the heated milk product, which may be in the form of dairy-based milk products (e.g., condensed milk), and non-dairy-based milk products in powdered form (e.g., almond milk, soy milk, etc.), is combined with the primary brew (214). In one embodiment, the combination of the milk product and primary brew occurs within the second chamber prior to a transfer to another chamber. In one embodiment, a sweetener may be added to the beverage (216). Accordingly, the primary brew is added to a second chamber and optionally a sweetener and milk product are added to the second chamber.

The temperature of the contents of the second chamber (e.g. primary brew) is lowered to a second temperature for a predetermined second time (216). In one embodiment, the second temperature is in the range of about 150-170 degrees Fahrenheit and in one embodiment, the temperature is in the range of about 160-164 degrees Fahrenheit. In one embodiment, the second temperature is about 160 degrees Fahrenheit. In one embodiment, the predetermined second time is about 30 seconds. The second chamber is configured to enable the cooling of the contents within the chamber (e.g. primary brew). In one embodiment, second chamber includes a heat exchanger to provide cooling by heat transfer from the contents to the heat exchanger. Accordingly, the temperature of the contents of the second chamber is controlled.

A secondary brew is created by chilling a second part of the brew water to a second temperature (218), and combining the chilled brew water with the contents of the second chamber (e.g. primary brew) to create a mixture with a third temperature (220). The second temperature is less than the first temperature. In one embodiment, the second temperature is from about 32-40 degrees Fahrenheit. In one embodiment, the second temperature is from about 33-36 degrees Fahrenheit. The third temperature is less than the first temperature and greater than the second temperature and, in one embodiment, the third temperature is about 30-50 degrees Fahrenheit below the first temperature. By lowering the temperature, the brewing process terminates (e.g. extraction of soluble flavors is limited). In one embodiment, the temperature is lowered by rapidly adding the chilled second part of the brew water. By maintaining the temperature of the primary brew, e.g. not cooling down the primary brew, the brewing process would continue to take place, which may lead to over-extraction of soluble flavors from the milled product into the primary brew. In one embodiment, over-extraction causes an undesired flavor profile. In one embodiment, the second part of the brew water is added based on the amount (e.g. volume) of contents of the second chamber (e.g. primary brew) and the desired flavor profile. In one embodiment, the percentage is 10-25% of the volume of the contents of the second chamber. Accordingly, the lowering of the temperature and creation of the secondary brew prevents undesired flavors (e.g. bitterness) in the final product by limiting oxidation of flavors and over-extraction of soluble flavors from the milled product.

As shown, step (220) takes place within the second chamber. In an alternate embodiment, step (220) may take place in a separate third chamber comprised of an oxygen impermeable material. To maintain product quality, the third chamber is evacuated of oxygen prior to merging the primary brew with the chilled second part of the brew water.

After the secondary brew is created, the secondary brew is filtered (222). In one embodiment, the secondary brew is filtered at step (222) through a filtration unit comprising a filtration medium (e.g., metal medium, paper medium, etc.) that is configured to filter out particulate (e.g., grinds) from the primary brew. The filtration unit may be a built-in tight strain. Details of the strain are not within the scope of the embodiments described herein. In one embodiment, the filtered secondary brew contains brew product having particle sizes less than about 20 microns. In one embodiment, the filtered secondary brew contains brew product having particle sizes less than about 5 microns. In one embodiment, after filtering at step (222) the total dissolved solids of the secondary brew is less than about 2.5%, and in another embodiment, the total dissolved solids of the secondary brew is in the range of about 1-2.5%. Accordingly, as shown, the filtering step may take place following creation of the secondary brew.

Following the filtration at step (222), the secondary brew is cooled to a fourth temperature to create the final brew (224). In one embodiment, the fourth temperature enables efficient absorption of inert gas by the final brew. In one embodiment, the fourth temperature is from about 32-40 degrees Fahrenheit. In one embodiment, the fourth temperature is adjusted so the final brew remains fluid. The filtered brew may be cooled in the chamber in which the secondary brew was created (e.g., the second chamber), or in one embodiment in a separate third chamber. Accordingly, the secondary brew is filtered and cooled in order to create the final brew.

In one embodiment, the creation of the final brew further comprises pressurizing the filtered brew with an inert gas such as but not limited to nitrogen (226). In one embodiment, the final brew is pressurized to at least about 35 pounds per square inch (psi). In one embodiment, the pressure is in the range of about 35-60 psi. In one embodiment, an increase in pressure is proportional to an increase in nitrogen saturation of the final brew. The pressurization at step (226) is performed to stabilize the final brew prior to packaging the final brew. More specifically, the pressurization of the product saturates the product with an inert gas such as, but not limited to, nitrogen, and limits the ability of the final brew to absorb oxygen throughout the shelf life of the final brew. The pressurizing may be performed by using an inert gas source, (e.g. nitrogen source). In one embodiment, the pressurizing at step (226) includes injecting an inert gas into the final brew to pressurize the brew to the desired pressure. The inert gas used to pressure the final brew at step (226) affects the flavor profile of the final brew including the feel of the flavor on the palette. A storage container is evacuated of oxygen (228), and the pressurized final brew is packaged in the storage container (230). The storage container is comprised of an $O_2$ impermeable material that is configured to maintain a minimum pressure of about 35 psi. For instance, the storage container may be a keg, can, bottle, etc. that is configured to maintain a minimum pressure of about 35 psi. In one embodiment, the storage container is a reusable and/or recyclable container. Accordingly, the final brew is pressurized and dispensed into a storage container in order to maintain a substantially oxygen free environment.

As discussed, each phase of the brewing process is designed to prevent contamination of the brew (e.g. oxidation and undesired flavors). Since the final brew is stored in an oxygen impermeable container, oxygen is prevented from entering the container. The final brew will be maintain a sustainably oxygen free environment until it is exposed to the surrounding air during any future dispensing. For example, if the storage container of the final brew is a keg, oxygen will be first introduced to the final brew when the keg is activated (i.e., "tapped"). If the storage container of the final brew is a can or bottle, oxygen will be first introduced to the final brew upon breaking of the seal of the can or bottle. In one embodiment, if the container is stored at ambient temperature (e.g. about 70 degrees Fahrenheit), the packaged final brew may remain stable for approximately a minimum of 30 days. However, if the storage container is kept refrigerated (e.g. below about 38 degrees Fahrenheit), the packaged final brew may remain stable for approximately a minimum of 90 days. In one embodiment, the final brew is stored in a holding reservoir prior to transfer to the packaging container, such as a keg. The final brew is saturated with an inert gas, such as nitrogen, and is configured limit exposure to oxygen during transfer from the holding reservoir to the packaging container.

As shown in FIGS. 1 and 2, the process for creating the brewed product minimizes the presence of $O_2$ throughout the entire brewing and packaging process to eliminate the negative effects associated with oxidation. In one embodiment, a pasteurization step is built into the brewing process during the heating of the brew water. The deoxygenation and pasteurization processes produce a product with enhanced flavor by obviating the need to artificially add preservatives to the brewed product, while simultaneously preserving many of subtle flavors of the brewed product. Additionally, the process of FIG. 1 can be implemented in a high-speed production environment, thereby eliminating the need to tie up the production lines with steps that can take over 24 hours. Furthermore, the beverage product produced by the processes of FIGS. 1 and 2 can be served both cold or hot with fewer preparation steps, more akin to the way draft beer is currently dispensed than to the way coffee is traditionally dispensed. Accordingly, the processes of FIGS. 1 and 2 produce a flavorful and long-lasting product.

Figure 3:
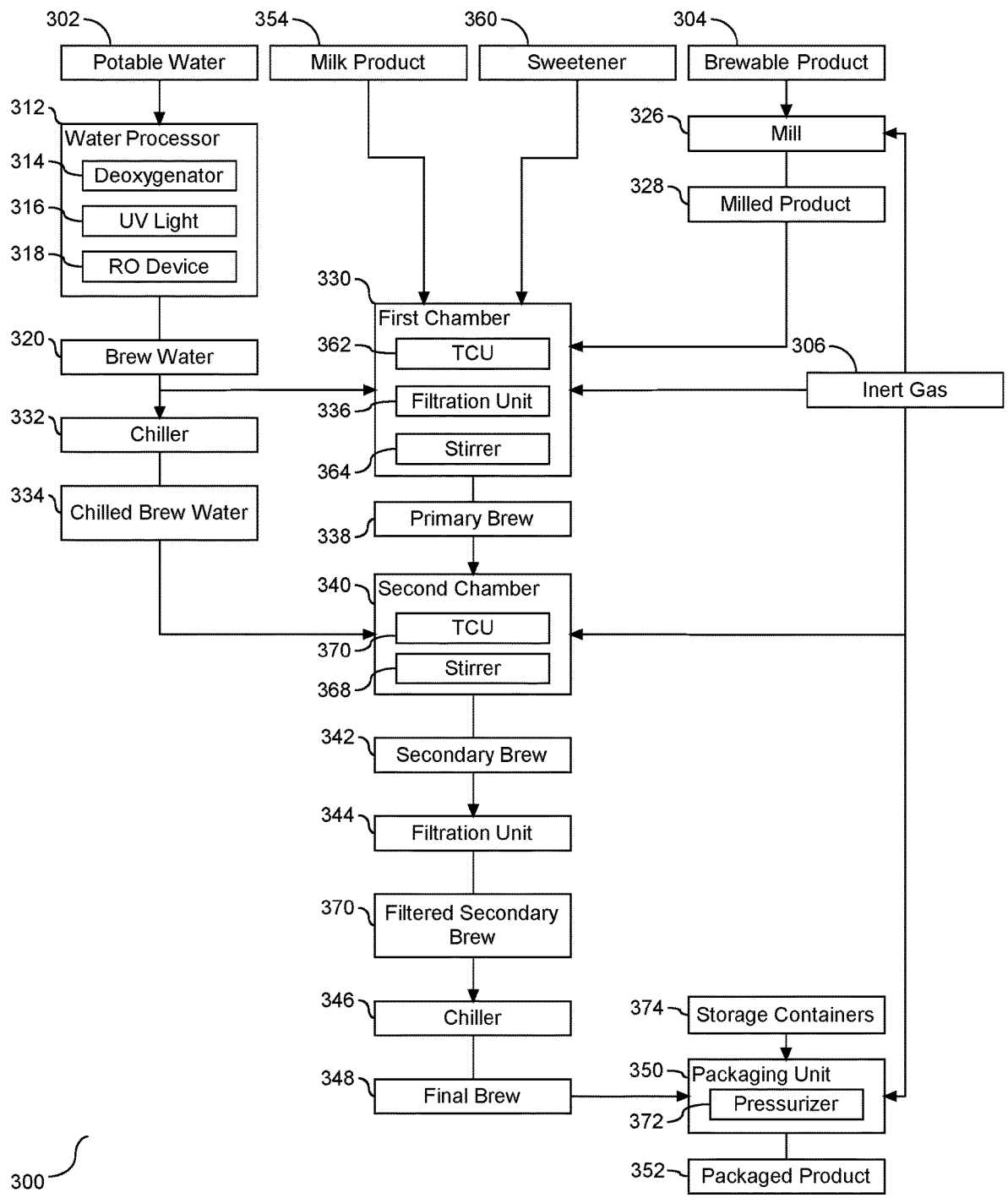
FIG. 3 depicts a block diagram illustrating a system to implement the processes of FIGS. 1 and 2.

With reference to FIG. 3, a block diagram (300) is provided illustrating a system for cold-brewing in a substantially oxygen free environment. As shown, a water processor (312) has an inlet for potable water (302). The water processor (312) is provided with a plurality of functionality to create brew water (320) from potable water (302) such as deoxygenator (314), ultra violet (UV) light source (316), and reverse osmosis (RO) device (318). The deoxygenator (314) removes oxygen from the potable water (302) utilizing a deoxygenating process. In one embodiment, the deoxygenating process includes passing potable water (302) through a hollow fiber membrane having a vacuum generator and/or an inert sweep gas (e.g. nitrogen, argon, etc.). In one embodiment, the deoxygenator (314) boils and/or sparges (e.g. bubbles an inert gas through) potable water (302). In one embodiment, after the deoxygenating process, the brew water (320) output from water processor (312) has a dissolved oxygen content of less than about 0.5 ppm. Accordingly, potable water (302) is subject to processing including oxygen removal.

The RO device (318) removes particulate, including dissolved solids, from potable water (302). The RO device (318) subjects potable water (302) to a reverse osmosis filtering process to remove dissolved solids. In one embodiment, the brew water (320) output from water processor (312) has a dissolved solid level less than about 75 ppm. The UV light source (316) exposes the potable water (302) to UV light to disinfect the potable water (302). In one embodiment, the brew water (320) output from water processor (312) is substantially disinfected and fit for consumption. The functionality of a RO device and UV light source are known in the art, and a further description of such devices will not be provided herein.

A mill (326) comprised of an oxygen impermeable material is provided with an inlet for brewable product (304) and inert gas (306). The brewable product (304) may be any product that can be brewed via a cold-brewing process, such as coffee, tea, (yerba) mate, etc. The mill (326) grinds brewable product (304) into a desired form (e.g. shape and size) that is optimal for flavor extraction to produce milled product (328). The milled product (328) is substantially free of oxygen. The environment within the mill (326) is maintained substantially free of oxygen by purging the mill (326) with inert gas (306). Accordingly, the mill (326) grinds the brewable product (304) in a substantially oxygen free environment to create a milled product (328) substantially free of oxygen.

A first chamber (330) comprised of an oxygen impermeable material has an inlet for brew water (320), inert gas (306), milled product (328), and in one embodiment, milk product (354) and sweetener (360). Brew water (320) may be stored in the first chamber (330). The first chamber (330) may be evacuated of oxygen by purging the chamber with inert gas (306). The first chamber (330) is provided with a plurality of functionality, including temperature control unit (TCU) (362), stirrer (364) and in one embodiment, filtration unit (336). TCU (362) provides temperature management of contents within the first chamber (330), such as heating and cooling of the contents. The TCU (362) heats the brew water (320), and in one embodiment milk product (354), from an initial temperature to a first temperature in the range from about 70-211 degrees Fahrenheit. The first chamber (330) is provided with a stirrer (364) in order to agitate the contents of the first chamber (330). Filtration unit (336) filters the contents of the first chamber (330) prior to outputting the contents as primary brew (338). In one embodiment, the filtration unit (336) includes a filter media in the range of about 5-20 microns. In one embodiment, the primary brew has a total dissolved solids of less than about 2.5%, and in another embodiment, the total dissolved solids of the primary brew is in the range of about 1-2.5%. Accordingly, the first chamber (330) maintains an environment substantially free of oxygen and processes brew water (320), milk product (354), and sweetener (360) to create primary brew (338).

The primary brew (338) output of the first chamber (330) is created by combining brew water (320) and milled product (328) for a predetermined contact time in order to extract soluble flavors from the milled product (328). Primary brew (338) has an initial pre-dilution strength (e.g. extracted soluble flavor concentration) based on the contact time and temperature of the contents. The pre-dilution strength affects the flavor profile of the final brew (348). The predetermined contact time is specific to the type of milled product (e.g. product type, origin, roast, grind, etc.), and in one embodiment, may be an amount of time ranging from about 30-600 seconds. In one embodiment, first chamber (330) combines milk product (354) and sweetener (360) to the contents of the first chamber (330) to create the primary brew (338).

Brew water (320) is subjected to a cooling process by chiller (332) to produce chilled brew water (334) at a second temperature. The second temperature is less than the first temperature. In one embodiment, the second temperature is from about 32-40 degrees Fahrenheit. A second chamber (340) comprised of an oxygen impermeable material is provided with an inlet for the primary brew (338), chilled brew water (334) and inert gas (306). The second chamber (340) may be evacuated of oxygen by purging the chamber with inert gas (306). The second chamber is provided with temperature control unit (TCU) (370) and stirrer (368). TCU (370) provides temperature management of contents within the chamber, such as heating and cooling of the contents. Stirrer (368) provides agitation of the contents within second chamber (340). The second chamber (340) processes the primary brew (338) and the chilled brew water (334) in a substantially oxygen free environment in order to create secondary brew (342).

The secondary brew (342) output of the second chamber (340) is created by combining chilled brew water (334) with primary brew (338). The combination of the chilled brew water (334) and primary brew (338) rapidly lowers the temperature of the primary brew (338) to a third temperature in order to limit further extraction of soluble flavors and/or undesired flavor profiles. The third temperature is less than the first temperature and greater than the second temperature. Secondary brew (342) is filtered by filtration unit (344) which includes a filtration medium (e.g., metal medium, paper medium, etc.) that is configured to filter out particulate (e.g., grinds) from secondary brew (342) in order to create filtered secondary brew (370). In one embodiment, the filtration unit is within second chamber (340) as a built-in tight strain. In one embodiment, the filtered secondary brew (370) has a total dissolved solids of less than about 2.5%, and in another embodiment, the total dissolved solids of the filtered secondary brew (370) is in the range of about 1-2.5%. Accordingly, the filtered secondary brew (370) is created by a dilution of the primary brew (338) with chilled brew water (334) and filtering by filtration unit (344).

Final brew (348) output of the chiller (346) is created by chilling (e.g. cooling) the filtered secondary brew (370) to a fourth temperature thereby creating the final brew (348). In one embodiment, the cooling of the filtered secondary brew (370) to create the final brew (348) enables efficient absorption of nitrogen by the final brew. The fourth temperature is independent of the first, second, and third temperatures. In one embodiment, the fourth temperature is from about 32-40 degrees Fahrenheit Packaging unit (350) is provided with an inlet for final brew (348) and one or more storage containers (374).

Packaging unit (350) is provided with pressurizer (372) to pressurize the final brew (348) utilizing inert gas (306). In one embodiment, the final brew (348) is pressurized to at least about 35 psi. In one embodiment, the final brew (348) is pressurized with nitrogen. In one embodiment, an increase in pressure is proportional to an increase in inert gas saturation of the final brew. The pressurization of the final brew (348) saturates the final brew (348) with inert gas (306) and limits the ability of the final brew (348) to absorb oxygen throughout the shelf life of the final brew (348). Packaging unit (350) fills a storage container (374) with the final brew (348). Storage containers (374) are comprised of an oxygen impermeable material that is configured to maintain a minimum pressure of about 35 psi. For instance, the storage container may be a keg, can, bottle, etc. that is configured to maintain a minimum pressure of about 35 psi. In one embodiment, the storage container is a reusable and/or recyclable container. Accordingly, the final brew (348) is pressurized with an inert gas and packaged by packaging unit (350) in order to create a packaged product (352).

Packaging unit (350), first chamber (330), second chamber (340), and mill (326) are configured to provide a substantially oxygen free environment throughout the brewing process, also referred to herein as a cold brewing process. The substantially oxygen free environment is provided by evacuation of the oxygen with the packaging unit (350), first chamber (330), second chamber (340), and mill (326) by purging the chambers with inert gas (306).

In one embodiment, the inert gas (306) may be generated by a nitrogen generating system (e.g., a nitrogenator). As is known in the art, nitrogen generating systems extract nitrogen from air, and store the extracted nitrogen in, for example, a storage tank. The stored nitrogen may then be injected into the final brew to pressurize the brew to the desired pressure.

The system of FIG. 3 has been presented as an illustrative example of a system to perform a beverage brewing process. It is to be understood that the arrangement of the components described in FIG. 3 is purely exemplary, and it is to be appreciated that the components may be arranged in accordance with the embodiments described herein. Accordingly, the components of FIG. 3 may be arranged and/or described as individual components, as a single component, or as a collection of individual component(s) and sub-combination(s) of components.

In one embodiment, the oxygen impermeable material may be, but is not limited to, stainless steel, aluminum, and glass.

In one embodiment, the inert gas is, but is not limited to, carbon dioxide, nitrogen, argon, helium, neon, xenon, and blends thereof. In one embodiment, the inert gas is nitrogen. In one embodiment, the nitrogen has a purity of at least about 99% nitrogen. In one embodiment, the nitrogen has a purity of at least about 99.7% nitrogen. In one embodiment, the nitrogen has a purity of at least about 99.9% nitrogen.

In one embodiment, impurities are removed prior to pressurizing the final brew, such as, but not limited to, carbon dioxide.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The flow charts and block diagrams in the Figures illustrate the architecture, functionality, and operation of possible implementations of systems, and methods according to various embodiments. It should be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the process functionality involved.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the form disclosed. Many modifications and variations will be apparent to those of ordinary skill in the art without departing from the scope and spirit of the claims. The embodiment was chosen and described in order to best explain the principles of the claims and the practical application, and to enable others of ordinary skill in the art to understand the claims for various embodiments with various modifications as are suited to the particular use contemplated.

It will be appreciated that, although specific embodiments have been described herein for purposes of illustration, various modifications may be made without departing from the spirit and scope of the claims. In particular, any gas enabling deoxygenation of the system may be used. In one embodiment, other undesired flavors or oxidative components may be evacuated or removed at any point during the brewing process. Accordingly, the scope of protection is limited only by the following claims and their equivalents.

What is claimed is:

1. A method of brewing a beverage in a substantially oxygen free environment comprising:
    heating a first brew water with a dissolved oxygen content of less than about 0.5 parts per million (ppm) to a first temperature, wherein the first temperature affects extraction of soluble flavor from a brewable product;
    chilling a second brew water with a dissolved oxygen content of less than about 0.5 ppm to a second temperature less than the first temperature;
    brewing in a substantially oxygen free environment, the brewing comprising:
        combining the first brew water and the brewable product to create a heterogeneous mixture;
        extracting soluble flavor from the brewable product into the first brew water including soaking the heterogeneous mixture for a predetermined contact time to create a primary brew;
        combining the primary brew with the chilled second brew water to create a secondary brew at a third temperature;
        filtering the secondary brew including removing the brewable product from the secondary brew; and
        cooling the filtered secondary brew to a fourth temperature to create a final brew;

pressurizing the filtered final brew with an inert gas; and packaging the filtered final brew in a storage container comprised of an oxygen impermeable material, wherein the storage container comprises a keg, can, or bottle.

2. The method of claim 1, wherein the final brew has a dissolved oxygen content of less than about 0.5 parts per million.

3. The method of claim 2, wherein the substantially oxygen free environment has an oxygen content of less than about 1 percent.

4. The method of claim 3, further comprising subjecting the first brew water and the second brew water to a sanitization process comprising:
   filtering the first brew water and the second brew water utilizing a reverse osmosis process to produce a sanitized brew water having a dissolved solid level less than about 75 ppm; and
   irradiating the first brew water and the second brew water utilizing ultraviolet light.

5. The method of claim 3, further comprising milling the brewable product in a substantially oxygen free environment.

6. The method of claim 5, wherein the substantially oxygen free environment is maintained by purging a brew vessel with nitrogen gas.

7. The method of claim 6, wherein the nitrogen gas is at least about 99.7% pure.

8. The method of claim 6, wherein the pressurizing comprises pressurizing the final brew with nitrogen gas to at least about 35 psi.

9. The method of claim 8, wherein the predetermined contact time is from about 30-600 seconds.

10. The method of claim 8, further comprises:
    pasteurizing a milk product, including heating the milk product to a temperature above about 161 degrees Fahrenheit; and
    adding the pasteurized milk product to the heterogeneous mixture.

11. The method of claim 6, wherein the first temperature is from about 170-205 degrees Fahrenheit, the second temperature is from about 33-36 degrees Fahrenheit, the third temperature is from about 30-50 degrees Fahrenheit less than the first temperature, and the fourth temperature is from about 33-40 degrees Fahrenheit.

12. A system for brewing a beverage comprising:
   a deoxygenator to remove oxygen from potable water to create a first brew water with a dissolved oxygen content of less than about 0.5 parts per million (ppm);
   a first substantially deoxygenated chamber comprising a temperature control unit (TCU) operable to heat a first brew water received from the deoxygenator to a first temperature, combine the first brew water and a brewable product to create a heterogeneous mixture, and extract soluble flavor from the brewable product into the first brew water including soaking the heterogeneous mixture for a predetermined contact time to create a primary brew;
   a chiller operable to chill a second brew water with a dissolved oxygen content of less than about 0.5 ppm received from the deoxygenator to a second temperature less than the first temperature;
   a second substantially deoxygenated chamber configured to receive and combine the primary brew with the chilled second brew water to create a secondary brew at a third temperature;
   a filter configured to filter the secondary brew including to remove the brewable product from the secondary brew;
   a cooler configured to cool the filtered secondary brew;
   a pressurizer configured to pressurize the filtered secondary brew with an inert gas; and
   a packager configured to package the filtered secondary brew in a storage container comprised of an oxygen impermeable material, wherein the storage container comprises a keg, can, or bottle.

13. The system of claim 12, wherein:
   the brewing system to brew the filtered secondary brew with a dissolved oxygen content of less than about 0.5 parts per million.

14. The system of claim 13, wherein the brewing system defines the substantially oxygen free environment with an oxygen content of less than about 1 percent.

15. The system of claim 14, further comprising subjecting the first brew water and the second brew water to a sanitization process comprising:
   filtering the first and second brew water utilizing a reverse osmosis device to sanitize the brew water to a dissolved solid level less than about 75 ppm; and
   irradiating the first and second brew water utilizing an ultraviolet light source.

16. The system of claim 14, further comprising a mill for milling the brewable product in a substantially oxygen free environment.

17. The system of claim 16, wherein further comprising a nitrogen gas purging means to purge a brew vessel with a nitrogen gas purging means.

18. The system of claim 17, wherein the nitrogen gas purging means is configured to purge with a nitrogen gas that is at least about 99.7% pure.

19. The system of claim 17, wherein the pressurizer is configured to pressurize filtered secondary brew with nitrogen gas to at least about 35 psi.

20. The system of claim 19, wherein the predetermined contact time is from about 30-600 seconds.

21. The system of claim 19, further comprising:
   the TCU to pasteurize a milk product, including heating the milk product to a temperature above about 161 degrees Fahrenheit; and
   a mechanical means to add the pasteurized milk product to the heterogeneous mixture.

22. The system of claim 17, wherein the first temperature is from about 170-205 degrees Fahrenheit, the second temperature is from about 33-36 degrees Fahrenheit, the third temperature is from about 30-50 degrees Fahrenheit less than the first temperature, and the fourth temperature is from about 33-40 degrees Fahrenheit.

* * * * *